United States Patent [19]

Nelkin et al.

[11] 3,753,260

[45] Aug. 14, 1973

[54] PULSE REFLECTION TEST MEANS FOR BALANCED PRESSURE SURVEILLANCE DETECTOR

[75] Inventors: Arthur Nelkin; Frederick G. Geil, both of Pittsburgh, Pa.

[73] Assignee: Westinghouse Electric Corporation, Pittsburgh, Pa.

[22] Filed: Oct. 4, 1971

[21] Appl. No.: 186,109

[52] U.S. Cl.................. 340/242, 340/214, 340/272, 73/205 R, 73/69, 73/40.5 A
[51] Int. Cl. .......................................... G08b 21/00
[58] Field of Search................ 340/242, 248 A, 214, 340/409, 261; 73/69, 205 R, 40, 40.5 A, 49.5; 200/81 R

[56] References Cited
UNITED STATES PATENTS

| | | | |
|---|---|---|---|
| 3,438,021 | 4/1969 | Nelkin et al. ........................ | 340/261 |
| 3,346,067 | 10/1967 | Schroeder............................ | 73/69 X |
| 3,466,642 | 9/1969 | Terramorsi ......................... | 340/242 |
| 3,600,674 | 8/1971 | Roberts............................ | 340/242 X |
| 3,631,439 | 12/1971 | Nichols............................ | 340/240 X |
| 3,358,788 | 12/1967 | Wilson.............................. | 73/151 X |
| 3,505,513 | 4/1970 | Fowler et al........................ | 340/242 |
| 3,304,546 | 2/1967 | Kern et al. ........................... | 340/242 |

Primary Examiner—John W. Caldwell
Assistant Examiner—William M. Wannisky
Attorney—F. H. Henson, M. P. Lynch et al.

[57] ABSTRACT

In a buried hose pressure responsive detection system for monitoring intrusion of a designated area, a combination of a pressure transducer means and a pulse reflection test means for determining the integrity of the buried hose is positioned at a common location in the hose for monitoring both intrusion of the designated area as well as providing random determination of the integrity of the hose. The pulse relfection test means functions to transmit a pressure pulse from the common location to a remote end of the hose and the pressure transducer means responds to the return of an unaltered pressure pulse reflected from the hose end as an indication of a no-fault hose condition. If however a hose fault condition exists, i.e. a hose break, the travel of the pressure pulse is foreshortened and an air pocket present in the hose at the fault location reflects an inverted version of the pressure pulse back to the pressure transducer means. The pressure transducer means generates a first level dc signal in response to an unaltered pressure pulse indicative of a no-fault hose condition and a second level dc signal in response to an inverted pressure pulse indicative of a fault hose condition.

5 Claims, 2 Drawing Figures

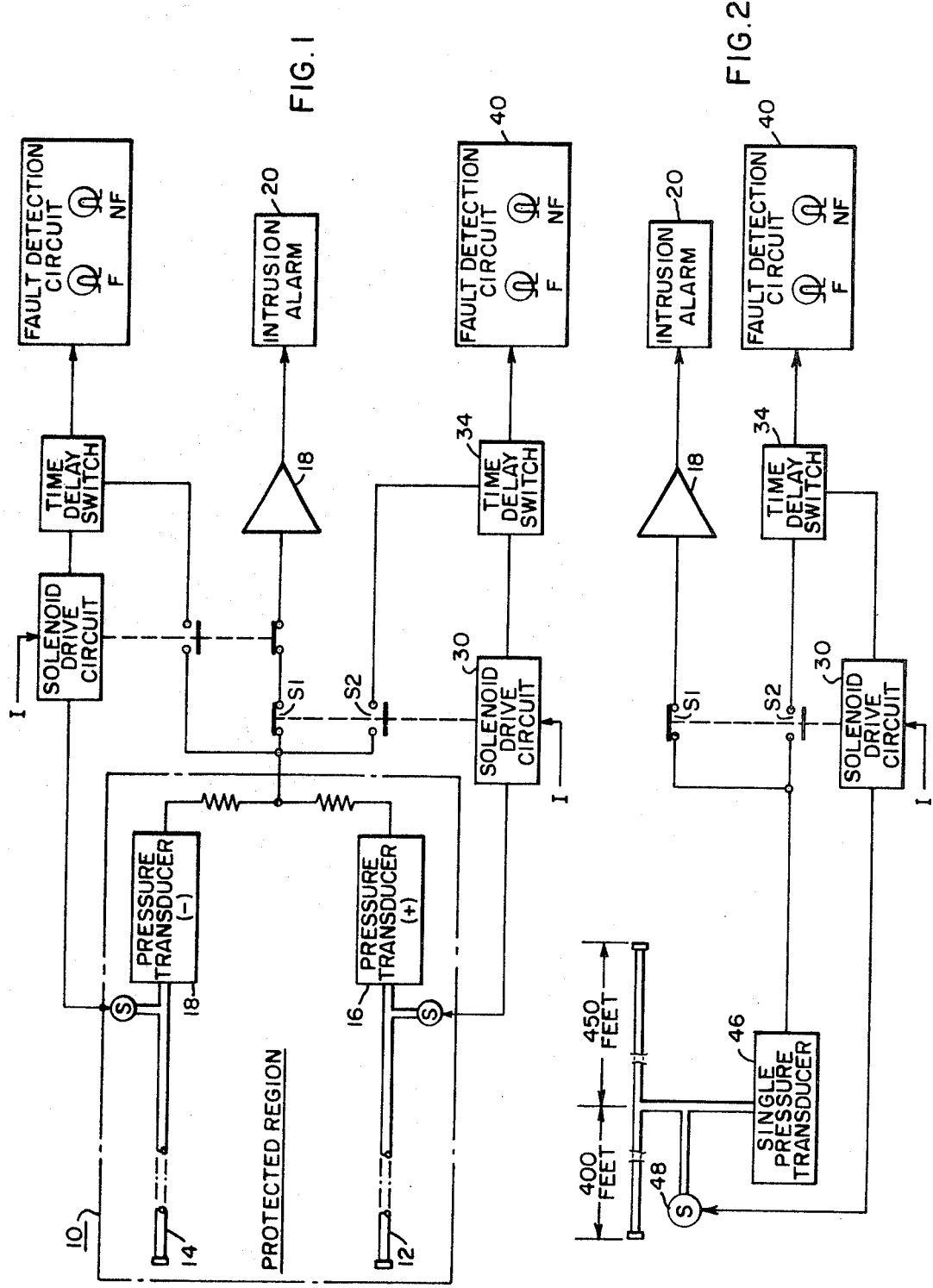

PULSE REFLECTION TEST MEANS FOR BALANCED PRESSURE SURVEILLANCE DETECTOR

BACKGROUND OF THE INVENTION

An underground, balanced pressure measuring system for determinging the intrusion of a designated area is described in detail in U.S. Pat. No. 3,438,021 issued to Nelkin et al. on July 26, 1965 and assigned to the assignee of the present invention. This system consists of a pair of buried fluid-filled hoses, with oppositely phased transducers and circuitry to produce an alarm if the differential pressure between hoses exceeds a level corresponding to an intrusion. This basic system utilizes interrogating transducer means positioned at the hose end opposite to the pressure transducers to transmit pulses the length of the hose in order to determine the integrity of the hose. A specific interrogating signal system is disclosed in U.S. Pat. application Ser. No. 663,013, entitled Pressure Intrusion Alarm System, filed Aug. 24, 1967 by Geil et al. and assigned to the assignee of the present invention. The positioning of the interrogating unit at an end remote from the pressure transducer detecting unit necessitates the use of long electrical cable runs between these remote ends which, not only increases the cost of the system, but renders the system susceptible to electrical faults, detection by an intruder and neutralizing countermeasures by an intruder.

SUMMARY OF THE INVENTION

In the embodiment described below a solenoid driver circuit is used to actuate a solenoid device to transmit a pulse from the transducer end of the buried hose down to the opposite end of the hose with the pulse being reflected back to the transducer, by either the opposite end of the hose or by an air pocket intermediate said ends of the hose in the event of a hose fault. Coincidentally with the generation of the solenoid driver pulse the normal alarm readout circuitry is disconnected from the pressure transducer and a hose fault detector circuit is connected to the output of the pressure transducer. The connection of the hose fault detector circuit to the output of the pressure transducer is delayed a sufficient period of time to prevent the hose fault detector circuit from responding to the pulse when it is first initiated. The duration of the pulse applied to the fluid in the buried hose is set to be greater than the period of time for travel of the pulse down the length of the hose and back to the pressure transducer in order to avoid pressure transducer response to the termination of the pulse. Assuming the application of a pulse of increasing pressure and attributing a positive pressure transducer output polarity to an increase in pressure, the pulse reflected back to the pressure transducer will correspond to an increase pressure pulse and a positive polarity output signal if the base is intact. If, however, air is present in any portion of the hose, which is indicative of a hose fault, the pressure pulse will be inverted and the pressure transducer will see it as a negative pressure pulse, and will correspondingly generate a negative polarity output signal. The output signal of the pressure transducer is then monitored by the hose fault detection circuit and an appropriate indication of hose integrity or hose fault will be produced.

DESCRIPTION OF THE DRAWING

The invention will become more readily apparent from the following exemplary description in connection with the accompanying drawings:

FIG. 1 is a block diagram schematic illustration of a preferred embodiment of the invention; and FIG. 2 is a block diagram schematic illustration of a modification of FIG. 1.

DESCRIPTION OF THE PREFERRED EMBODIMENT

Referring to FIG. 1 there is illustrated diagrammatically, a pressure sensitive apparatus 10 including a pair of fluid-filled tubes 12 and 14 and pressure transducers 16 and 18 concealed beneath the surface of the earth to provide intrusion protection of the area designated "Protected Region". The tubes 12 and 14 are composed of compliant material, such as rubber, and the fluid with which each tube is filled is an incompressible gas or liquid.

In providing intrusion protection for any "Protected Region" a plurality of security apparatuses 10, each including an amplifier 18, is disposed around the perimeter of the region. As described in the above reference U.S. Pat. No. 3,438,021, the application of a uniform pressure to both hoses 12 and 14, as would result from atmospheric pressure conditions, produces a net zero differential pressure between hoses 12 and 14 and results in a net zero combined electrical output from the transducers 16 and 18. If, however, a net differential pressure is established between hoses 12 and 14, as would result from intrusion, causing change in pressure in the fluid of one of the hoses, the combined electrical output signals from transducers 16 and 18 produces a net electrical signal other than zero. This signal is amplified by amplifier 18 and transmitted to intrusion alarm circuit 20 which produces an indication of intrusion of the "Protected Region." It is apparent that while the illustrated embodiment utilizes separate pressure transducers and electrically combines them in a bucking fashion to produce a differential pressure measurement, it would be equally appropriate to use a differential pressure transducer for providing direct indication of a net differential pressure between hoses 12 and 14. Examples of such differential pressure transducers are illustrated in pending U.S. Pat. application Ser. No. 857,961 filed Sept. 15, 1969 by Edward W. Nichols and assigned to the assignee of the present invention, and U.S. Pat. application Ser. No. 113,999, filed Feb. 9, 1971 by Geil et al and assigned to the assignee of the present invention.

In addition to the intrusion monitoring and detecting apparatus, there is provided a hose integrity checking circuit associated with each of the hoses 12 and 14, comprised essentially of solenoid drive circuit 30, solenoid unit 32, solenoid drive circuit actuated switch contacts S1 and S2, time delay switching circuit 34 and hose fault detection circuit 40. Inasmuch as the components and operation of the components of the hose integrity checking circuits associated with the hoses 12 and 14 are identical, the description of operation of the hose integrity checking circuits will be confined to the components associated with hose 12. For purposes of explanation, assume transducer 16 generates a positive polarity output pulse in response to an increase in fluid pressure within the hose 12, and that the pulse introduced into the fluid of hose 12 by solenoid 32 in response to an activating signal from solenoid drive circuit 30 results in an increase in pressure in the fluid of hose 12.

Solenoid drive circuit 30 responds to an input signal I by actuating solenoid 32 to introduce a pulse in the fluid of hose 12 of a duration which exceeds the period of time required for the pulse to travel to the remote end of hose 12 and return to pressure transducer 16. Simultaneous with the actuation of solenoid 32, solenoid drive circuit 30 changes switch contact S1 from a normally closed to an open state, thereby isolating amplifier circuit 18 and intrusion alarm circuit 20 from the response of pressure transducer 16 and changing normally open switch contacts S2 to a closed state to electrically connect the hose fault detection circuit 40 to the output of the pressure transducer 16. The isolation of the amplifier 18 and intrusion alarm circuit 20 from the interrogating pulse provided by solenoid 32 prevents saturation of the amplifier 18 and the generation of an erroneous alarm condition by the intrusion alarm circuit 20. The application of the output signal from the pressure transducer 16 to the hose fault detection circuit 40 is delayed by time delay switch 34 for a period of time sufficient to prevent response of the hose fault detection circuit 40 to the initial pressure pulse condition thereby rendering it responsive only to the reflected pressure pulse as monitored by the pressure transducer 16. In other words, the hose fault detection circuit 40 is connected to respond solely to the pulse after it has been reflected back from an air pocket in the case of a fault condition in the hose 12, or in the case of a no-fault condition from the end of hose 12 which is remote from the pressure transducer 16 and solenoid 32. The change in contact positions of the switch contacts S1 and S2 is maintained for a period of time sufficiently in excess of the maximum travel time to provide stabilization of the system and isolation of the amplifier 18 and instrusion alarm circuit 20 from "ringing" conditions. The maximum pulse travel time corresponds to a no-fault condition in the hose 12, wherein the pulse travels from the solenoid 32 to the remote end of the hose 12 where it is reflected back to the pressure transducer 16. The pulse travel time will be reduced by the presence of an air pocket, indicative of a hose fault intermediate the solenoid 32 and the remote end of the hose 12. As an example, assuming a hose fault approximately half way between the remote end of the hose and the pressure transducer 16, a pressure pulse introduced by solenoid 32 would be reflected and inverted by the air pocket and returned to the pressure transducer 16 in approximately one half of the time required for pulse travel under no-fault hose conditions. The pressure pulse is inverted due to the pressure release that occurs when a leak or fault in the hose is encountered.

Under no-fault hose conditions a fluid pulse introduced by solenoid 32 into hose 12 resulting in an increase in pressure in the fluid of hose 12 is reflected by the remote end of hose 12 back to the pressure transducer 16 as an increase in pressure pulse. The pressure pulse is not inverted due to the absence of a pressure loss indicative of a leak or fault. This results in a positive output voltage signal from the pressure transducer 16, which is interpreted by the hose fault detection circuit 40 as being indicative of a no-fault hose condition. This condition can be manifested by a visual indication such as the energization of a light NF representative of a no-fault condition. On the other hand, if the increased pressure pulse introduced into the fluid of hose 12 encounters an air pocket and is reflected back in an inverted condition corresponding to a decrease fluid pressure, a negative output voltage signal from pressure transducer 16 is produced, which is interpreted by the hose fault detection circuit 40 as indicative of the presence of a fault in hose 12. This fault condition can likewise be manifested visually by the actuation of an appropriate light F.

As schematically illustrated in FIG. 2, a single pressure transducer 46 and an accompanying solenoid 48 in combination with the circuitry identified in FIG. 1 is utilized to interrogate the condition of a double length of buried hose. In order to distinguish between pressure pulsess reflected from opposite ends of the double hose length, the combination of the pressure transducer 46 and the solenoid 48 is positioned slightly off-center to vary the travel times of the pressure pulse from the opposite ends of the double hose length. In the event of hose integrity in both lengths, the pulse reflected by the remote end of the 400 ft. length of hose will be received by pressure transducer 46 before the pulse reflected by the remote ends of a 450 ft. length of hose. In the event of a fault in either hose, the inverted pulse reflected back to the pressure transducer 46 will be indicative of a hose fault indication.

We claim as our invention:

1. In a security apparatus, including a fluid-filled pressure responsive hose member, a pressure transducer means operatively associated with said fluid in said hose member for generating a signal indicative of changes in the fluid pressure in said hose, and an intrusion alarm circuit means operatively connected to said pressure transducer means and responsive to said signal, the combination of, a hose integrity checking means operatively associated with said fluid in said hose including means for transmitting a pressure change in said fluid to determine the presence or absence of hose faults, said pressure change being reflected back from the remote end of said hose to said pressure transducer means in the absence of a hose fault, said pressure change being reflected back from a hose location corresponding to a hose fault to said pressure transducer means in the presence of a hose fault, hose fault detection circuit means operatively connected to said pressure transducer means for responding to said reflected pressure change to indicate the presence or absence of a hose fault, and means for delaying the connection of said hose fault detection means to said pressure transducer means for a period of time sufficient to prevent said hose fault detection means from responding to the initial pressure change while assuring the response of said hose fault detection means to the reflected pressure change.

2. In a security apparatus, including a fluid-filled pressure responsive hose member, a pressure transducer means operatively associated with said fluid in said hose member for generating a signal indicative of changes in the fluid pressure in said hose, and an intrusion alarm circuit means operatively connected to said pressure transducer means and responsive to said signal, the combination of, a hose integrity checking means operatively associated with said fluid in said hose including means for transmitting a pressure change in said fluid to determine the presence or absence of hose faults, said pressure change being reflected back from the remote end of said hose to said pressure transducer means in the absence of a hose fault, said pressure change being reflected back from a hose location corresponding to a hose fault to said pressure transducer means in the presence of a hose fault, wherein said pressure change is a pulse having a duration which exceeds the maximum period of time of travel of the initial pressure change from the hose integrity checking means to the remote end of said hose and the time of travel of the reflected pressure change to said pressure transducer means, and hose fault detection circuit means operatively connected to said pressure transducer means for responding to the reflected pressure change by indicating the presence or absence of a hose fault.

3. In a security apparatus, including a fluid-filled pressure responsive hose member, a pressure transducer means operatively associated with said fluid in said hose member for generating a signal indicative of changes in the fluid pressure in said hose, and an intrusion alarm circuit means operatively connected to said pressure transducer means and responsive to said signal, the combination of, a hose integrity checking means operatively associated with said fluid in said hose including means for transmitting a pressure change in said fluid to determine the presence or absence of hose faults, said pressure change being reflected back from the remote end of said hose to said pressure transducer means in the absence of a hose fault, said pressure change being reflected back from a hose location corresponding to a hose fault to said pressure transducer means in the presence of a hose fault, and hose fault detection circuit means operatively connected to said pressure transducer means to produce a first manifestation in response to a reflected pressure change indicative of the absence of a hose fault and a second manifestation in response to a reflected pressure change indicative of the presence of a hose fault, wherein said first manifestation corresponds to a first pressure change travel time representing the time for the pressure change to be transmitted to the remote end of said hose and reflected back to said pressure transducer means, and said second manifestation corresponds to a second pressure change travel time which is less than said first pressure change travel time.

4. In a security apparatus, including a fluid-filled pressure reponsive hose member, a pressure transducer means operatively associated with said fluid in said hose member for generating a signal indicative of changes in the fluid pressure in said hose, and an intrusion alarm circuit means operatively connected to said pressure transducer means and responsive to said signal, the combination of, a hose integrity checking means operatively associated with said fluid in said hose including means for transmitting a pressure change in said fluid to determine the presence or absence of hose faults, said pressure change being reflected back from the remote end of said hose to said pressure transducer means in the absence of a hose fault, said pressure change being reflected back from a hose location corresponding to a hose fault to said pressure transducer means in the presence of a hose fault, and hose fault detection circuit means operatively connected to said pressure transducer means to produce a first manifestation in response to a reflected pressure change indicative of the absence of a hose fault and a second manifestation in response to a reflected pressure change indicative of the presence of a hose fault, wherein said first manifestation corresponds to a reflected pressure change of the same pressure polarity as the transmitted pressure change, and said second manifestation corresponds to a reflected pressure change of a pressure polarity opposite to the pressure polarity of the transmitted pressure change.

5. In a security apparatus as claimed in claim 4 wherein said pressure transducer means responds to a reflected pressure change indicative of the absence of a hose fault by developing a first dc output signal and responds to a reflected pressure change indicative of the presence of a hose fault by developing a second dc output signal.

* * * * *